Sheet 1.
2 Sheets.

G. M. Peters Jr.
Harvester Droppers.

Nº 69018   Patented Sept. 17, 1867

Witnesses:
Theo Tusch
Wm Truman

Inventor:
G. M. Peters
Per Munn
Attorneys

G. M. Peters Jr.
Harvester Droppers.
Nº 69018    Patented Sept. 17, 1867
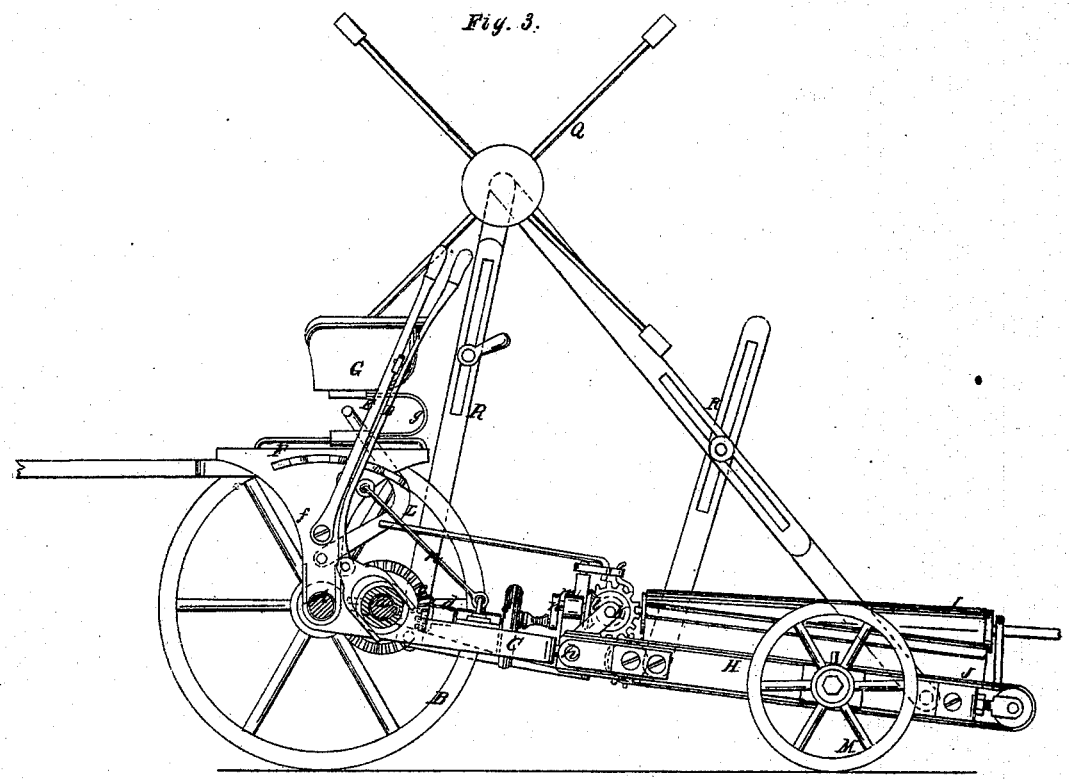

UNITED STATES PATENT OFFICE.

G. M. PETERS, JR., OF GRANVILLE, OHIO.

IMPROVEMENT IN HARVESTERS.

Specification forming part of Letters Patent No. 69,018, dated September 17, 1867.

*To all whom it may concern:*

Be it known that I, G. M. PETERS, Jr., of Granville, in the county of Licking and State of Ohio, have invented a new and Improved Harvesting-Machine; and I do hereby declare that the following is a full, clear, and exact description thereof, which will enable those skilled in the art to make and use the same, reference being had to the accompanying drawings, forming part of this specification, in which—

Figure 1:
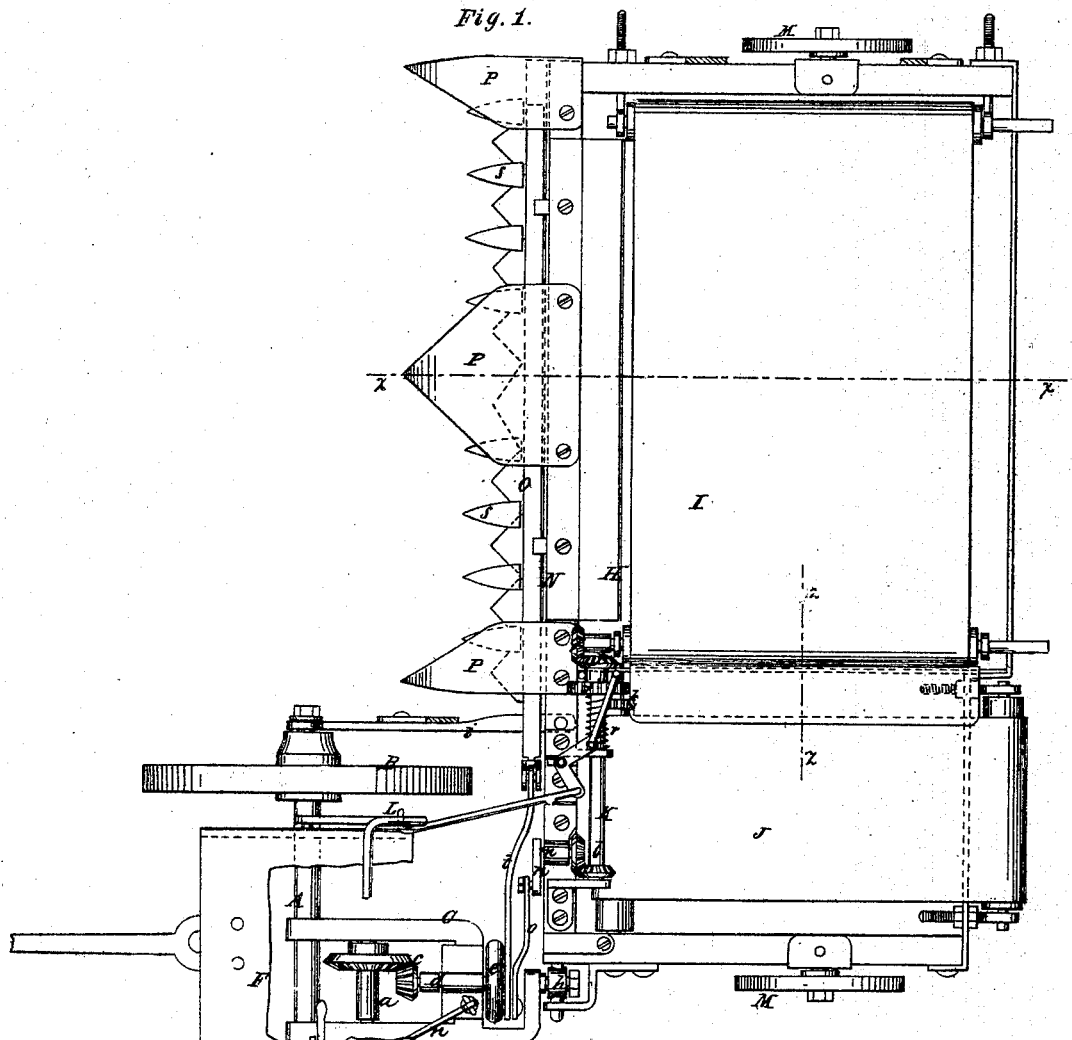
Figure 2:
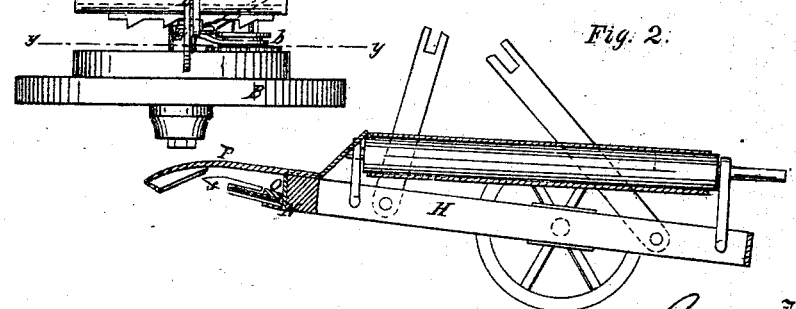

Figure 1, Sheet No. 1, is a plan or top view of my invention; Fig. 2, a transverse vertical section of the same, taken in the line $xx$, Fig. 1; Fig. 3, Sheet No. 2, a side sectional view of the same, taken in the line $yy$, Fig. 1; and Fig. 4, a longitudinal section of a portion of the same, taken in the line $zz$, Fig. 1.

Similar letters of reference indicate corresponding parts.

This invention relates to a new and improved harvesting-machine designed for general purposes—to wit, the cutting of grass or grain and standing corn-stalks.

The invention consists in a novel and improved construction of the frame of the machine, arrangement of the driver's seat, cutting device, &c., as hereinafter fully shown and described, whereby the device is rendered capable of operating perfectly in cutting all standing crops.

A represents an axle, having a wheel, B, keyed or otherwise secured on each end of it; and C is a small metallic frame, which is fitted loosely on the axle A, extending back from it, as shown clearly in Fig. 1, and having a shaft, $a$, placed transversely in it, and which is rotated from one of the wheels B by gears $b$, the gear on the shaft $a$ being connected and disconnected with the shaft by means of a clutch actuated by a lever, D, which is attached to a lever, E, the fulcrum-pin of the latter passing through one of the standards of a platform, F, over the axle A.

The shaft $a$ communicates motion by means of gears $c$ to a longitudinal shaft, $d$, in the frame $c$, the shaft $d$ having a crank-wheel, $e$, on its rear end. (See Figs. 1 and 3.)

The platform F is supported on the axle A by two standards, $f$, the axle passing loosely through the latter, and the driver's seat G is supported by this platform, the former being on elastic bars $gg$.

H represents the grain-platform frame of the device, which is of rectangular form, and is connected at one end to the rear end of the small metallic frame C by a universal joint, $h$, and connected to one end of the axle A by a bar, $i$, the latter fitting loosely on the axle. (See Fig. 1.)

On the platform-frame H there are two endless aprons or carriers, I J, the former, I, having a position parallel with the front and rear of the frame H, and the latter, J, having a position at right angles with I, so as to receive the cut grain or stalks from it and discharge them upon the ground. The apron or carrier J is operated from a shaft, K, by gears $l$ from a shaft, $m$, having a crank-wheel, $n$, upon it, which is driven from the crank-wheel $e$ of shaft $d$ by a connecting-rod, $o$. (Shown clearly in Fig. 1.) The apron or carrier I is driven by gears $p\,q$ from the shaft K, and the gear $p$ is connected with the gear $j$, and is allowed to slide on shaft K, said gears $p\,q$ having a spiral spring, $r$, bearing them, which spring has a tendency to keep the gear $p$ engaged with the gear $q$ free from the gear K. By this means the apron or carrier J is prevented from discharging the cut grain or stalks until a sufficient quantity has been discharged upon it from the apron or carrier I. These gears $p\,q$ are moved or shifted by a lever, L, which is within convenient reach of the driver on seat G.

The platform H is supported by a wheel, M, at each end, and to the front edge of the platform H a finger-bar, N, is attached, provided with fingers $s$, in or through which a reciprocating toothed sickle, O, works, said sickle being driven by a rod, $t$, from the crank-wheel $e$.

In cutting standing corn guides P are attached to the front edge of the frame H, as shown clearly in Fig. 1. These guides serve to guide the stalks in the hills to the teeth of the sickle and fingers between them.

In cutting corn I propose to employ a sickle with longer teeth than usual, and have the teeth as well as the fingers incline upward, so as to obtain an oblique cut. (See Fig. 2.)

Q is a reel, which has its bearings in adjustable standards R, to admit of being adjusted higher or lower, according to the height of the grain.

In cutting grass the endless aprons or carriers I J are, of course, not required; and in cutting grain an appropriate sickle may be applied, the guides P not being required. The cut grain or stalks fall upon the apron I, which conveys them upon the apron J, which, whenever the driver actuates the lever L, is put in motion and is made to discharge them.

The lever E is connected to the metallic frame C by means of a rod, $u$, and by adjusting this lever the sickle may be raised or lowered to cut at the desired height from the surface of the ground.

Having thus described my invention, what I claim as new, and desire to secure by Letters Patent, is—

The combination of the two endless aprons or carriers I J, constructed and operating as described, frames H C, axle A, and sickle O, with or without the guides P, all arranged to operate substantially as and for the purpose set forth.

G. M. PETERS, JR.

Witnesses:
O. P. MEEKS,
T. R. PETERS.